US009083631B2

(12) United States Patent
Niger et al.

(10) Patent No.: US 9,083,631 B2
(45) Date of Patent: Jul. 14, 2015

(54) MULTIPOINT-TO-POINT PSEUDOWIRE

(75) Inventors: Philippe Niger, Lannion (FR); Frédéric Jounay, Lausanne (CH)

(73) Assignee: Orange, Paris (FR)

( * ) Notice: Subject to any disclaimer, the term of this patent is extended or adjusted under 35 U.S.C. 154(b) by 303 days.

(21) Appl. No.: 13/577,482

(22) PCT Filed: Feb. 10, 2011

(86) PCT No.: PCT/FR2011/050280
§ 371 (c)(1),
(2), (4) Date: Aug. 7, 2012

(87) PCT Pub. No.: WO2011/098732
PCT Pub. Date: Aug. 18, 2011

(65) Prior Publication Data
US 2012/0307837 A1   Dec. 6, 2012

(30) Foreign Application Priority Data
Feb. 11, 2010   (FR) ...................... 10 50975

(51) Int. Cl.
*H04L 12/56* (2006.01)
*H04L 12/761* (2013.01)
(52) U.S. Cl.
CPC ..................... *H04L 45/16* (2013.01)
(58) Field of Classification Search
CPC ...... H04L 45/16; H04L 12/2861; H04L 45/68
USPC .......................... 370/235, 256, 408
See application file for complete search history.

(56) References Cited

U.S. PATENT DOCUMENTS

| 6,879,594 | B1 * | 4/2005 | Lee et al. ...................... 370/408 |
| 2004/0213228 | A1 * | 10/2004 | Tingle et al. .................. 370/389 |
| 2007/0030851 | A1 | 2/2007 | Sinicrope et al. |
| 2008/0225711 | A1 * | 9/2008 | Raszuk et al. ............. 370/230.1 |
| 2008/0259931 | A1 * | 10/2008 | Papadimitriou ........... 370/395.3 |

FOREIGN PATENT DOCUMENTS

| EP | 1653675 A1 * | 5/2006 |
| WO | WO 03/092226 A1 | 11/2003 |
| WO | WO 2007/022640 A1 | 3/2007 |

* cited by examiner

*Primary Examiner* — Andrew Chriss
*Assistant Examiner* — Romani Ohri
(74) *Attorney, Agent, or Firm* — Drinker Biddle & Reath LLP

(57) ABSTRACT

A method is provided for transmitting a data stream from a plurality of terminating (leaf) devices toward another terminating (root) device, the leaf and root devices forming the ends of a multipoint-to-point pseudowire based on a packet switched network to which the terminating devices belong, the method comprising: receiving, by a switching device, also belonging to the packet switched network, a first data stream sent by a first leaf device toward the root device, receiving, by the switching device, a second data stream sent by a second leaf device toward the root device, aggregating the first and second data streams into a third data stream, the switching device having been configured to aggregate the first and second data streams via a parameter called the aggregation parameter, included in a pseudowire establishment request, and transmitting the third data stream toward the root device.

4 Claims, 4 Drawing Sheets

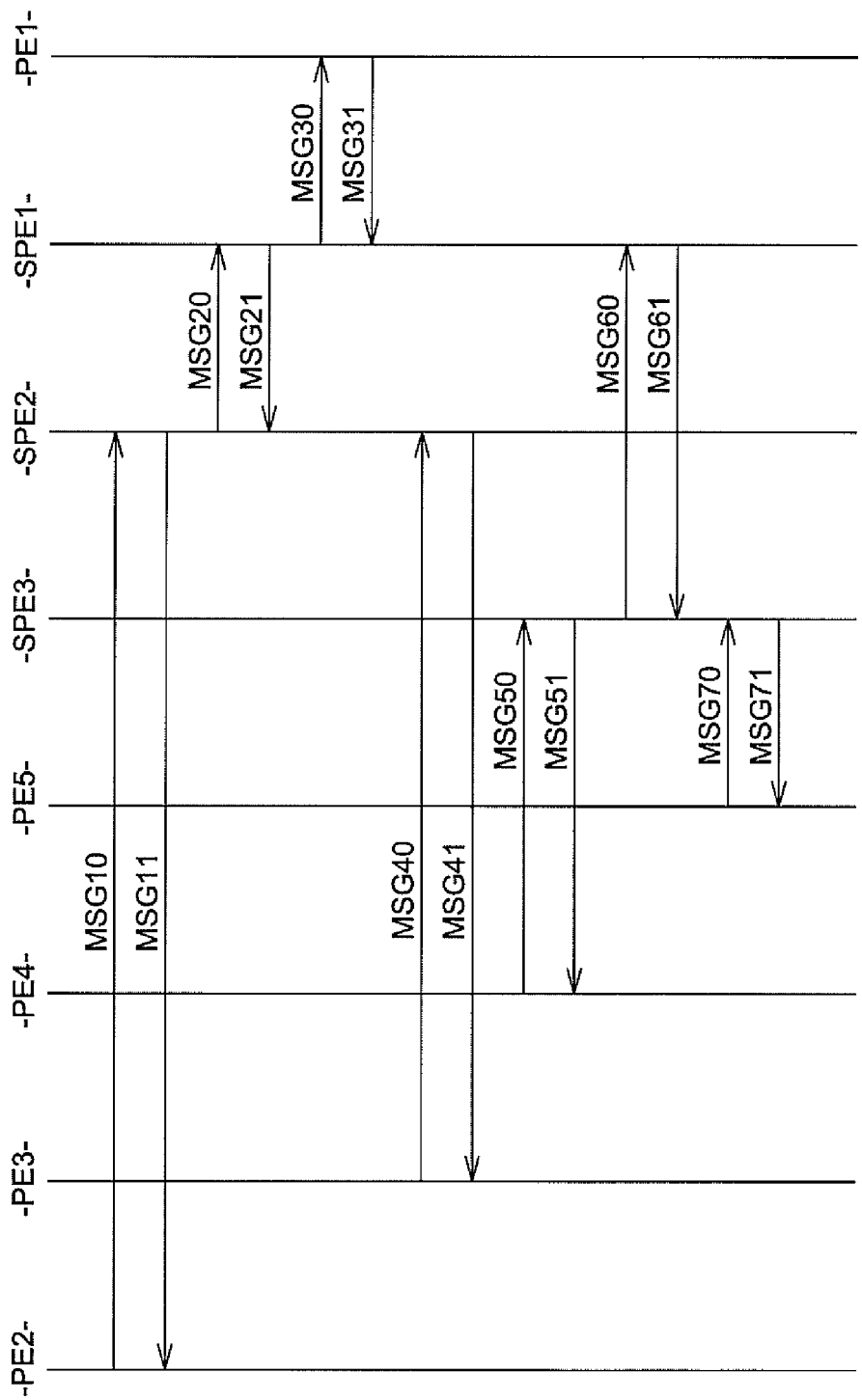

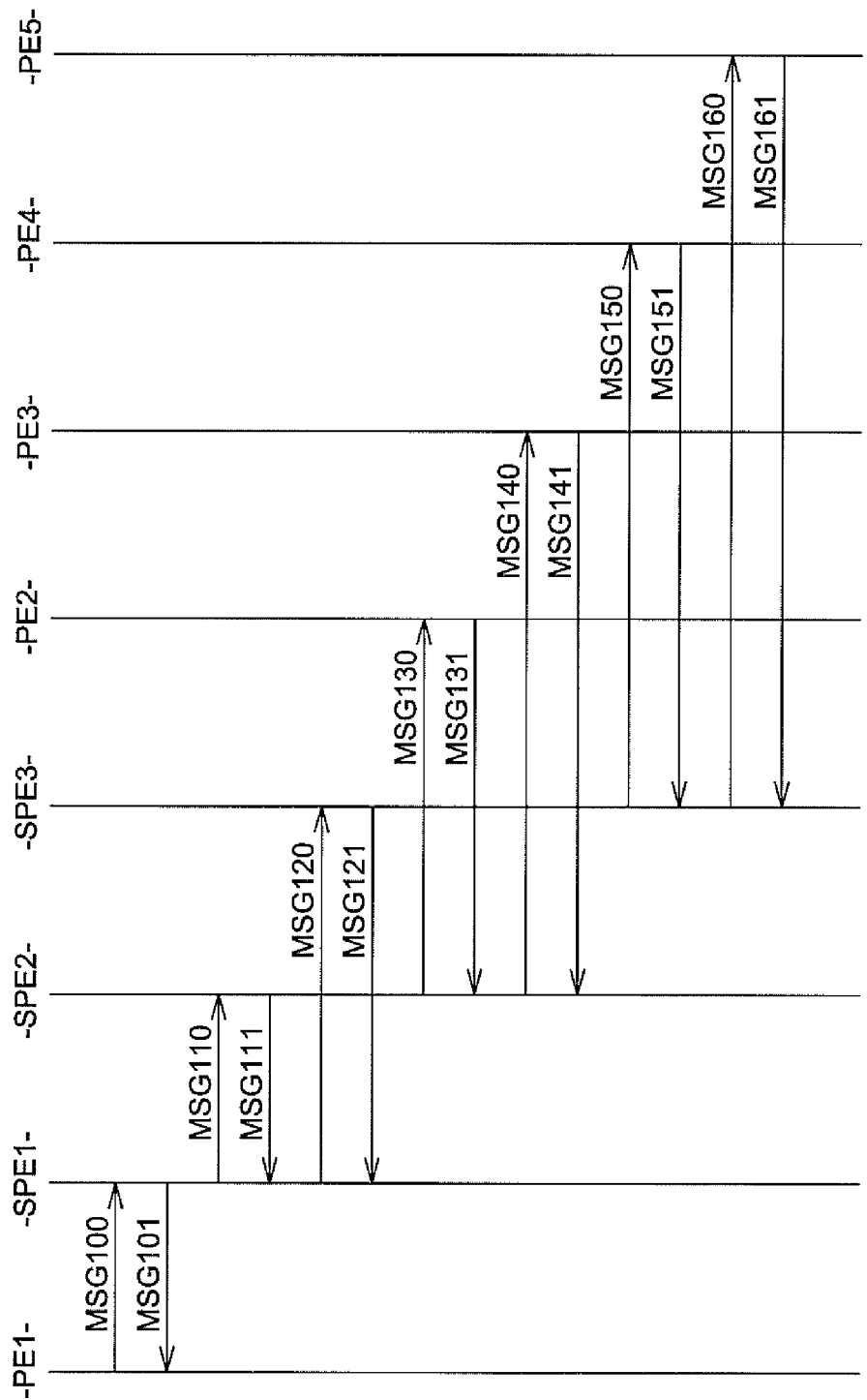

MULTIPOINT-TO-POINT PSEUDOWIRE

CROSS-REFERENCE TO RELATED APPLICATIONS

This application is the U.S. national phase of the International Patent Application No. PCT/FR2011/050280 filed Feb. 10, 2011, which claims the benefit of French Application No. 10 50975 filed Feb. 11, 2010, the entire content of which is incorporated herein by reference.

FIELD

The invention relates to the field of telecommunications, and more specifically the field of packet switched networks.

BACKGROUND

In a packet switched network (PSN) (the term used in English), the data to be transmitted take the form of packets which are processed by the switching devices of the network until they reach their destination. The set of packets to be transmitted from a source to a destination forms a data stream.

An example of a method used in packet switched networks for routing data packets is MPLS (multiprotocol label switching). The purpose of the MPLS method is to add to the headers of data packets one or more labels containing information allowing the network switching devices to determine the next hop that a packet must complete in order to reach its destination. The MPLS method is detailed in a document published by the IETF ("Internet Engineering Task Force", an Internet standardization team), reference RFC 3031 (where RFC signifies "Request For Comments").

However, the MPLS can only be used to route packets conforming to the protocol known as IP (Internet Protocol).

In order to overcome this problem, the PWE3 (PseudoWire Emulation Edge to Edge) standardization team of the IETF has defined the concept of a "pseudowire" for the emulation of a point-to-point link between two devices, this link being based on a packet switched network using the IP/MPLS technology. Pseudowires of this kind, as defined in document RFC 3985, can be used to transmit data packets not conforming to the IP protocol, such as data packets conforming to the ATM protocol.

The document "Signaling Root-Initiated Point-to-Multipoint Pseudowires using LDP", draftmartini-pwe3-p2mp-pw-01.txt, proposes a solution for providing a point-to-multipoint pseudowire from a root device to a plurality of terminating devices, called leaf devices, thereby forming a data distribution tree.

In this type of architecture, the traffic is distributed in the downstream direction, in other words from the root device to the set of leaf devices. The traffic in the upstream direction, in other words from one of the leaf devices toward the root device, flows through a separate point-to-point pseudowire established between this leaf device and the root device.

Thus it is necessary to establish a number of point-to-point pseudowires equal to the number of leaf devices, creating a harmful loss of bandwidth and entailing a high degree of complexity for the establishment and maintenance of the set of pseudowires.

In particular, since all the point-to-point pseudowires terminate on the root device, they have to be identified and controlled independently by the root device, which considerably complicates the control of this device. This is because it is necessary to configure each pseudowire individually, to maintain a signaling session with each leaf device for the maintenance of the pseudowires, to supervise individually each pseudowire established in this way, and so on. Moreover, controlling the volume of data to be aggregated at the root device is made more complicated.

SUMMARY

One of the objects of the invention is to overcome these drawbacks of the prior art.

Accordingly, the invention proposes a method of transmitting data streams from a plurality of terminating devices, called leaf devices, toward another terminating device, called the root device, the leaf and root devices forming the ends of a multipoint-to-point pseudowire based on a packet switched network to which the terminating devices belong, the method comprising:

- a step in which a switching device, also belonging to the packet switched network, receives a first data stream sent by a first leaf device toward the root device,
- a step in which the switching device receives a second data stream sent by a second leaf device toward the root device,
- a step in which the first and second data streams are aggregated into a third data stream, the switching device having been configured to aggregate the first and second data streams by means of a parameter called the aggregation parameter, included in a pseudowire establishment request,
- a step in which the third data stream is transmitted toward the root device.

Thus the data streams can be transmitted by means of a single pseudowire established between the various leaf devices and the root device. A solution of this type only uses a small amount of bandwidth, because a single pseudowire is established between the various terminating devices. A solution of this type can also simplify the monitoring and control operations used by the switching devices which aggregate the data streams and by the root device, since the latter device only has to control one pseudowire for the transmission of data streams sent by the leaf devices toward the root device, in other words the transmission in the upstream direction.

The solution proposed by the invention also enables the data streams to be transmitted bidirectionally via a pseudowire established between a root device and a plurality of leaf devices. In this example, since a point-to-multipoint pseudowire has already been established between the root and the leaf devices, the solution proposed by the invention enables a multipoint-to-point pseudowire to be established in the upstream direction of transmission, thus providing bidirectional communication between the root device and the leaf devices.

The invention also proposes a method for establishing a multipoint-to-point pseudowire via which data streams are intended to be transmitted from a plurality of terminating devices, called leaf devices, toward another terminating device, called the root device, the leaf and root devices forming ends of the pseudowire, the pseudowire being based on a packet switched network to which the terminating devices belong, the method comprising:

- a step in which a switching device, also belonging to the packet switched network, receives a request for the establishment of the pseudowire, comprising an identifier of the root device, an identifier of at least one leaf device, an identifier of the pseudowire, and a parameter called the aggregation parameter,
- a step in which the switching device is configured by means of the aggregation parameter, at the end of which the switching device is capable of aggregating a first data stream sent by the leaf device and a second data stream sent by another leaf device into a third data stream to be sent to the root device, a step in which the switching device transmits the request for the establishment of the pseudowire to the destination device.

Since the leaf devices and the root devices can belong to a plurality of different pseudowires, it is necessary to be able to identify the multipoint-to-point pseudowire via which the data streams sent by the various leaf devices are to be transmitted.

The identifier of the pseudowire can be used as an implicit aggregation parameter. This is because, when two data streams are sent, respectively, by a first and a second leaf device toward the same root device via the same pseudowire, this means that the switching device must aggregate the data streams.

A solution of this type enables the switching device to be configured in such a way that it can aggregate the data streams sent by a plurality of leaf devices, so that the root device receives only a single data stream.

According to one characteristic of the establishment method proposed by the invention, after the request for establishment has been sent by a first leaf device, the method comprises, on reception by the switching device of a second request for establishment of the pseudowire sent by a second leaf device, a step of determining the capacity of the switching device to aggregate the first data stream and the second data stream into a third data stream, the second request for establishment of the pseudowire not being transmitted toward the root device in this case.

Thus the multipoint-to-point pseudowire is established at the initiative of the leaf devices. This embodiment enables an additional leaf device to be connected to a multipoint-to-point pseudowire established previously. In this case, the identifier of the leaf device can be omitted from the request for the establishment of the pseudowire.

According to another characteristic of the establishment method proposed by the invention, after the request for the establishment of the pseudowire is sent by the root device, the method comprises a step of transmission of the establishment request comprising the identifier of the root device, a list comprising the identifiers of at least two root devices, the identifier of the pseudowire and the aggregation parameter, to be sent to the leaf devices forming one end of the pseudowire.

In an embodiment of this type, the multipoint-to-point pseudowire is established at the initiative of the root device. The pseudowire is established by the progressive distribution of the establishment request until the set of leaf devices is reached. In this embodiment, the pseudowire is established on the basis of a single establishment request sent by the root device. The identifiers of the leaf devices enable the establishment request to be routed via the packet switched network.

The invention also proposes a switching device belonging to a packet switched network which also includes terminating devices forming ends of a multipoint-to-point pseudowire via which data streams are intended to be transmitted from certain terminating devices, called leaf devices, toward another terminating device, called the root device, the switching device comprising:

means by which a switching device, also belonging to the packet switched network, receives a first data stream sent by a first leaf device toward the root device, means by which the switching device receives a second data stream sent by a second leaf device toward the root device, means by which the first and second data streams are aggregated into a third data stream, the switching device having been configured to aggregate the first and second data streams by means of a parameter called the aggregation parameter, included in a pseudowire establishment request, means by which the third data stream is transmitted toward the root device.

According to one characteristic of the switching device proposed by the invention, the device comprises:

means for receiving a request for the establishment of the pseudowire, comprising an identifier of the root device, an identifier of at least one leaf device, an identifier of the pseudowire, and a parameter called the aggregation parameter, means for configuring the switching device by means of the aggregation parameter, at the end of which the switching device is capable of aggregating a first data stream sent by the leaf device and a second data stream sent by another leaf device into a third data stream to be sent to the root device, means for transmitting the request for the establishment of the pseudowire toward the destination device.

According to one characteristic of the switching device proposed by the invention, the receiving means are capable of receiving a second request for the establishment of the pseudowire sent by a second leaf device, the establishment request having been sent by a first leaf device, the switching device comprising means for determining a capacity of the switching device to aggregate the first data stream and the second data stream into a third data stream to be transmitted toward the root device.

According to one characteristic of the switching device proposed by the invention, after the request for the establishment of the pseudowire has been sent by the root device, the switching device comprises means for transmitting the establishment request toward a plurality of leaf devices forming one end of the pseudowire.

The invention also proposes a terminating device belonging to a packet switched network and forming one of the ends of a multipoint-to-point pseudowire via which data streams are to be transmitted from certain terminating devices, called leaf devices, toward another terminating device, called the root device, the terminating device comprising means for sending a request for the establishment of the pseudowire, comprising an identifier of the root terminating device, an identifier of at least one leaf device, an identifier of the pseudowire, and a parameter, called an aggregation parameter, for use in a step of configuration of a switching device which also belongs to the packet switched network, at the end of which step the switching device is capable of aggregating a first data stream sent by a first leaf device and a second data stream sent by a second leaf device into a third data stream.

The invention further relates to a signal sent by a first terminating device, belonging to a packet switched network, toward at least a second terminating device, the first and second terminating devices forming ends of a multipoint-to-point pseudowire via which data streams are to be transmitted from certain terminating devices, called leaf devices, toward another terminating device, called the root device.

A signal of this type is characterized in that it carries a message comprising a request for the establishment of the pseudowire, comprising an identifier of the root device, an identifier of at least one leaf device, an identifier of the pseudowire and a parameter, called the aggregation parameter, intended for use in a step of configuration of a switching device which also belongs to the packet switched network, at the end of which step the switching device is capable of aggregating a first data stream sent by a first leaf device and a second data stream sent by a second leaf device into a third data stream to be transmitted to the root device.

According to other aspects, the invention also relates to computer programs comprising program code instructions for implementing the steps of the transmission and establishment methods described above when these programs are executed by a computer.

Each of the computer programs described above can use any programming language, and can be in the form of source code, object code, or a code intermediate between source and object code, such as a code in partially compiled form, or any other desirable form.

The invention also proposes a computer-readable recording medium on which a computer program as described above is recorded.

The data medium can be any entity or device capable of storing the program. For example, the medium can include a storage means such as a ROM ("Read Only Memory"), for example a CD-ROM or a microelectronic circuit ROM, or a magnetic recording means such as a diskette (floppy disk) or a hard disk.

On the other hand, the data medium can be a transmissible medium such as an electrical or optical signal which can be routed via an electrical or optical cable, by radio or by other means. The program according to the invention can be, in particular, downloaded from a network such as the Internet.

Alternatively, the data medium can be an integrated circuit in which the program is incorporated, the circuit being adapted to execute the method in question or to be used in its execution.

BRIEF DESCRIPTION OF THE DRAWINGS

Other characteristics and advantages will be made clear by the description of embodiments with reference to the drawings, wherein:

FIG. 2 shows a time diagram of the message exchange between the leaf devices and the root device during the establishment of the multipoint-to-point pseudowire according to a first embodiment of the invention, FIG. 3 shows a time diagram of the message exchange between the root device and the leaf devices during the establishment of the multipoint-to-point pseudowire according to a second embodiment of the invention.

DETAILED DESCRIPTION

Figure 1:
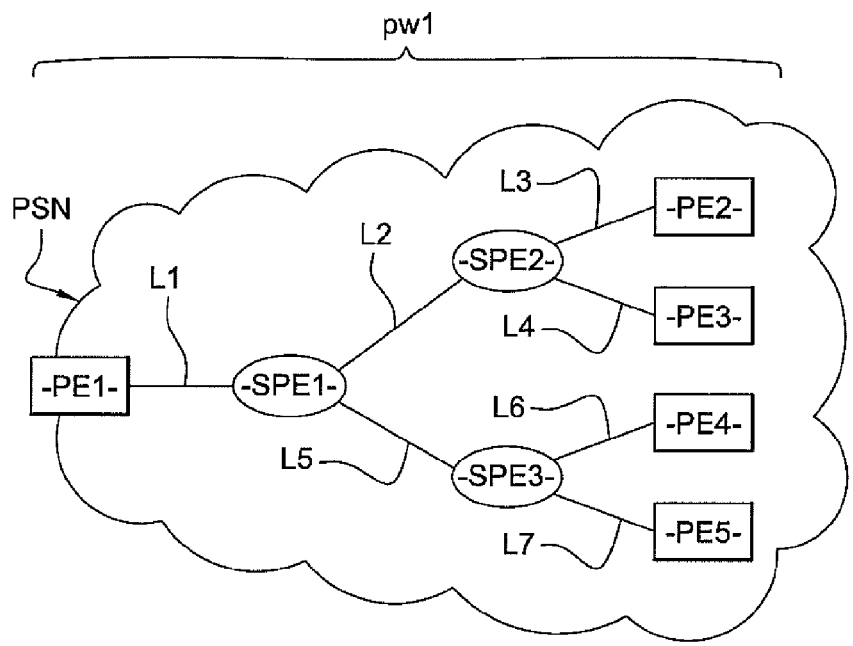
FIG. 1 shows a multipoint-to-point pseudowire established between a plurality of leaf devices and a root device.

With reference to FIG. 1, a multipoint-to-point pseudowire pw1, based on a packet switched network PSN, is established between four terminating devices, called leaf devices, PE2, PE3, PE4 and PE5, positioned at the edge of the network PSN, and a terminating device PE1, which is also positioned at the edge of the network PSN. A pseudowire pw1 of this type is formed by a first link L1 established between the root device PE1 and a first switching device SPE1, a second link L2 established between the first switching device SPE1 and a second switching device SPE2, and a third link L3 established between the second switching device SPE2 and the leaf device PE2. A fourth link L4, also forming part of the pseudowire pw1, is established between the second switching device SPE2 and the leaf device PE3. A fifth link L5, forming part of the pseudowire pw1, is established between the first switching device SPE1 and a third switching device SPE3. A sixth link L6, forming part of the pseudowire pw1, is established between the third switching device SPE3 and the leaf device PE4. A seventh link L7, also forming part of the pseudowire pw1, is established between the third switching device SPE3 and the leaf device PE5.

A multipoint-to-point pseudowire pw1 of this type is intended to transmit data streams sent by the leaf devices PE2, PE3, PE4, PE5 toward the root device PE1. The terminating devices PE1, PE2, PE3, PE4, PE5 are, for example, IP/MPLS nodes.

The data making up the data streams sent by the leaf devices PE2, PE3, PE4, PE5 are generated by client devices which are connected to the various leaf devices and which are not shown in the drawing.

An example of the application of the invention is traffic collection for a mobile network. In this example, the client devices are base stations for transmitting data via the pseudowire pw1 toward the root device, which is itself connected to a client device such as a radio network controller (RNC).

This multipoint-to-point pseudowire can be established at the initiative of the leaf devices PE2, PE3, PE4 and PE5 or at the initiative of the root device PE1.

According to a first embodiment of the invention, shown in FIG. 2, the establishment of the multipoint-to-point pseudowire pw1 is initiated by the leaf devices PE2, PE3, PE4 and PE5, and is based on the exchange of establishment messages between the various devices concerned.

Figure 7A:
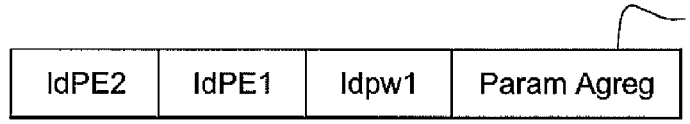
FIGS. 7A and 7B show requests for the establishment of the multipoint-to-point pseudowire in the first and second embodiments of the invention.

In this first embodiment, the leaf device PE2 sends a first establishment message MSG10 toward the switching device SPE2. This message MSG10 is, for example, a Label Request message as defined in IETF document RFC4447. The message MSG10 comprises a request for the establishment of the pseudowire pw1, comprising an identifier IdPE2 of the leaf device PE2, an identifier IdPE1 of the root device PE1, and an identifier of the pseudowire pw1 Idpw1. According to the invention, this establishment request also comprises an aggregation parameter ParamAgreg, whose function is explained subsequently in this document. This message MSG10 is shown in FIG. 7A.

On receiving the message MSG10, the switching device SPE2 completes a switching table TC, using the data included in the request for the establishment of the pseudowire pw1. An entry is created in the switching table TC for the leaf device PE2. This entry comprises the identifier IdPE2 of the leaf device PE2, the identifier Idpw1 of the pseudowire pw1, the identifier IdPE1 of the root device, a label lbl3 intended to be associated with the data to be sent by the leaf device PE2 toward the switching device SPE2, and the parameter ParamAgreg.

At the end of this configuration step, the switching device SPE2 sends a message MSG11 toward the leaf device PE2. This message MSG11 is, for example, a Label Mapping message as defined in IETF document RFC4447. The message MSG11 comprises the identifier IdPE2 of the leaf device PE2, the identifier IdPE1 of the root device PE1, and the label lbl3.

At the end of this configuration step, the switching device SPE2 is capable of aggregating a first data stream sent by the leaf device PE2 and a second data stream sent by another leaf device, such as the leaf device PE3, into a third data stream sent toward the root device PE1.

The switching device SPE2 also sends a message MSG20 toward the switching device SPE1. This message MSG20 is identical to the message MSG10.

The switching device SPE2 uses a routing table in order to transmit the message MSG10 toward the switching device SPE1.

On receiving this message MSG20, the switching device SPE1 completes a switching table TC, using the data included in the request for the establishment of the pseudowire pw1. An entry is created in the switching table TC for the leaf device PE2. This entry comprises the identifier IdPE2 of the leaf device PE2, the identifier Idpw1 of the pseudowire pw1, the identifier IdPE1 of the root device, a label lbl2 intended to be associated with the data to be sent by the switching device SPE2 toward the switching device SPE1, and the parameter ParamAgreg.

At the end of this configuration step, the switching device SPE1 is capable of aggregating a first data stream sent by the switching device SPE2 and a second data stream sent by another switching device, such as the switching device SPE3, into a third data stream sent toward the root device PE1.

The switching device SPE1 then sends a message MSG21 toward the switching device SPE2. This message MSG21 is, for example, a Label Mapping message. The message MSG21 comprises the identifier IdPE2 of the leaf device PE2, the identifier IdPE1 of the root device PE1, the identifier of the pseudowire Idpw1 and the label lbl2.

The label lbl2 is used by the switching device SPE2 to update its switching table.

The switching device SPE1 also sends a message MSG30 toward the switching device PE1. This message MSG30 is identical to the message MSG10.

The switching device SPE1 uses a routing table in order to transmit the message MSG30 toward the root device PE1.

On receiving this message MSG30, the root device PE1 sends a message MSG31 toward the switching device SPE1. This message MSG31 is, for example, a Label Mapping message. The message MSG31 comprises the identifier IdPE2 of the leaf device PE2, the identifier IdPE1 of the root device PE1, the identifier of the pseudowire Idpw1, and a label lbl1 intended to be associated with the data to be transmitted by the switching device SPE1 toward the root device PE1.

The label lbl1 is used by the switching device SPE1 to update its switching table.

The leaf device PE3 sends a first establishment message MSG40 toward the switching device SPE2. This message MSG40 is, for example, a Label Request message. The message MSG40 comprises a request for the establishment of the pseudowire pw1, comprising an identifier IdPE3 of the leaf device PE3, an identifier IdPE1 of the root device PE1, the identifier of the pseudowire pw1 Idpw1, and an aggregation parameter ParamAgreg.

On receiving the message MSG40, the switching device SPE2 completes a switching table TC, using the data included in the request for the establishment of the pseudowire pw1. An entry is created in the switching table TC for the leaf device PE3. This entry comprises the identifier IdPE3 of the leaf device PE3, the identifier Idpw1 of the pseudowire pw1, the identifier IdPE1 of the root device, a label lbl4 intended to be associated with the data to be sent by the leaf device PE3 toward the switching device SPE2, and the parameter ParamAgreg.

The switching device SPE2 then sends a message MSG41 toward the leaf device PE3. This message MSG41 is, for example, a Label Mapping message. The message MSG41 comprises the identifier IdPE3 of the leaf device PE3, the identifier IdPE1 of the root device PE1, the identifier of the pseudowire Idpw1 and the label lbl4.

The switching device SPE2 is already configured to aggregate a first data stream, sent by the leaf device PE2, and a second data stream, sent by another leaf device such as the leaf device PE3, into a third data stream to be sent to the root device PE1, since an entry in the switching table TC comprises the aggregation parameter ParamAgreg. Consequently, since the request for the establishment of the pseudowire pw1 has already been transmitted toward the root device PE1, the switching device SPE2 does not transmit the request for the establishment of the pseudowire pw1 toward the root device PE1. The label lbl2, already allocated by the switching device SPE1, is used to transmit the data stream sent by the switching device SPE2 toward the switching device SPE1.

The leaf device PE4 sends a first establishment message MSG50 toward the switching device SPE3. This message MSG50 is, for example, a Label Request message. The message MSG50 comprises a request for the establishment of the pseudowire pw1, comprising an identifier IdPE4 of the leaf device PE4, an identifier IdPE1 of the root device PE1, the identifier of the pseudowire pw1 Idpw1, and an aggregation parameter ParamAgreg.

On receiving the message MSG50, the switching device SPE3 completes a switching table TC, using the data included in the request for the establishment of the pseudowire pw1. An entry is created in the switching table TC for the leaf device PE4. This entry comprises the identifier IdPE4 of the leaf device PE4, the identifier Idpw1 of the pseudowire pw1, the identifier IdPE1 of the root device, a label lbl6 intended to be associated with the data to be sent by the leaf device PE3 toward the switching device SPE3, and the parameter ParamAgreg.

At the end of this configuration step, the switching device SPE3 sends a message MSG51 toward the leaf device PE4. This message MSG51 is, for example, a Label Mapping message. The message MSG51 comprises the identifier IdPE4 of the leaf device PE4, the identifier IdPE1 of the root device PE1, the identifier of the pseudowire Idpw1 and the label lbl6.

At the end of this configuration step, the switching device SPE3 is capable of aggregating a first data stream sent by the leaf device PE4 and a second data stream sent by another leaf device, such as the leaf device PE5, into a third data stream sent toward the root device PE1.

The switching device SPE3 also sends a message MSG60 toward the switching device SPE1. This message MSG60 is identical to the message MSG50.

The switching device SPE3 uses a routing table in order to transmit the message MSG60 toward the switching device SPE1 so as to reach the root device PE1.

On receiving this message MSG60, the switching device SPE1 completes a switching table TC, using the data included in the request for the establishment of the pseudowire pw1. An entry is created in the switching table TC for the leaf device PE4. This entry comprises the identifier IdPE4 of the leaf device PE4, the identifier Idpw1 of the pseudowire pw1, the identifier IdPE1 of the root device, a label lbl5 intended to be associated with the data to be sent by the switching device SPE3 toward the switching device SPE1, and the parameter ParamAgreg.

The switching device SPE1 then sends a message MSG61 toward the switching device SPE3. This message MSG61 is, for example, a Label Mapping message. The message MSG61 comprises the identifier IdPE4 of the leaf device PE4, the identifier IdPE1 of the root device PE1, the identifier of the pseudowire Idpw1 and the label lbl5.

The switching device SPE1 is already configured to aggregate a first data stream, sent by the switching device SPE2, and a second data stream, sent by the switching device SPE3, into a third data stream to be sent to the root device PE1, since an entry in the switching table TC comprises the aggregation parameter ParamAgreg. Consequently, since the request for the establishment of the pseudowire pw1 has already been transmitted toward the root device PE1, the switching device SPE1 does not transmit the request for the establishment of the pseudowire pw1 toward the root device PE1. The label lbl1, already allocated by the root device PE1, is used to transmit the data stream sent by the switching device SPE1 toward the root device PE1.

The leaf device PE5 sends a first establishment message MSG70 toward the switching device SPE3. This message MSG70 is, for example, a Label Request message. The message MSG70 comprises a request for the establishment of the pseudowire pw1, comprising an identifier IdPE5 of the leaf device PE5, an identifier IdPE1 of the root device PE1, the identifier of the pseudowire pw1 Idpw1, and an aggregation parameter ParamAgreg.

On receiving the message MSG70, the switching device SPE3 completes the switching table TC, using the data included in the request for the establishment of the pseudowire pw1. An entry is created in the switching table TC for the leaf device PE5. This entry comprises the identifier IdPE3 of the leaf device PE5, the identifier Idpw1 of the pseudowire pw1, the identifier IdPE1 of the root device, a label lbl7 intended to be associated with the data to be sent by the leaf device PE5 toward the switching device SPE3, and the parameter ParamAgreg.

The switching device SPE3 then sends a message MSG71 toward the leaf device PE5. This message MSG71 is, for example, a Label Mapping message. The message MSG71 comprises the identifier IdPE5 of the leaf device PE5, the identifier IdPE1 of the root device PE1, the identifier of the pseudowire Idpw1 and the label lbl7.

The switching device SPE3 is already configured to aggregate a first data stream, sent by the leaf device PE4, and a second data stream, sent by another leaf device such as the leaf device PE5, into a third data stream to be sent to the root device PE1, since an entry in the switching table TC comprises the aggregation parameter ParamAgreg. Consequently, since the request for the establishment of the pseudowire pw1 has already been transmitted toward the root device PE1, the switching device SPE3 does not transmit the request for the establishment of the pseudowire pw1 toward the root device PE1. The label lbl5, already allocated by the switching device SPE1, is used to transmit the data stream sent by the switching device SPE3 toward the switching device SPE1.

At the end of all these message exchanges, the multipoint-to-point pseudowire is established between the leaf devices PE2, PE3, PE4 and PE5 and the root device PE1.

According to a second embodiment of the invention, shown in FIG. 3, the establishment of the multipoint-to-point pseudowire pw1 is initiated by the root device PE1, and is based on the exchange of establishment messages among the various devices concerned.

Figure 7B:
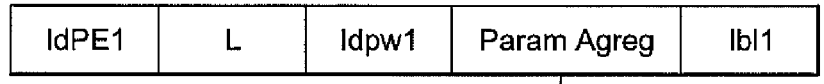

In this second embodiment, the root device PE1 sends a first establishment message MSG100 toward the switching device SPE1. This message MSG100 is, for example, a Label Mapping message. The message MSG100 comprises a request for the establishment of the pseudowire pw1 comprising an identifier IdPE1 of the root device PE1, a list L comprising the respective identifiers IdPE2, IdPE3, IdPE4 and IdPE5 of the leaf devices PE2, PE3, PE4, PE5, an identifier of the pseudowire pw1 Idpw1, an aggregation parameter ParamAgreg, and a label lbl1 intended to be associated with the data to be transmitted by the switching device SPE1 toward the root device PE1. This message MSG100 is shown in FIG. 7B.

On receiving the message MSG100, the switching device SPE1 completes the switching table TC, using the data included in the request for the establishment of the pseudowire pw1. An entry is created in the switching table TC for each of the various leaf devices PE2, PE3, PE4 and PE5. For example, the entry for the leaf device PE2 comprises the identifier IdPE2 of the leaf device PE2, the identifier of the pseudowire pw1 Idpw1, the identifier IdPE1 of the root device, and the parameter ParamAgreg.

At the end of this configuration step, the switching device SPE1 is capable of aggregating a first data stream transmitted by the switching device SPE2 and a second data stream sent by another switching device, such as the switching device SPE3, into a third data stream sent toward the root device PE1. The label lbl1, already allocated by the root device PE1, is used to transmit the data stream sent by the switching device SPE1 toward the root device PE1.

The switching device SPE1 then sends a message MSG101 toward the root device PE1, acknowledging receipt of the message MSG101 by the switching device SPE1.

The switching device SPE1 also sends a message MSG110 toward the switching device SPE2 and a message MSG120 toward the switching device SPE3. The message MSG110 comprises at least the respective identifiers IdPE2, IdPE3 of the leaf devices PE2 and PE3, together with a label lbl2 intended to be associated with the data to be transmitted by the switching device SPE2 toward the switching device SPE1. The message MSG120 comprises at least the respective identifiers IdPE4, IdPE5 of the leaf devices PE4 and PE5, together with a label lbl5 intended to be associated with the data to be transmitted by the switching device SPE3 toward the switching device SPE1. The switching device SPE1 uses a routing table in order to transmit the message MSG110 toward the switching device SPE2 so as to reach the leaf devices PE2 and PE3, and toward the switching device SPE3 so as to reach the leaf devices PE4 and PE5.

On receiving the message MSG110, the switching device SPE2 completes a switching table TC, using the data included in the request for the establishment of the pseudowire pw1. An entry is created in the switching table TC for the leaf device PE2 and the leaf device PE3.

At the end of this configuration step, the switching device SPE2 is capable of aggregating a first data stream transmitted by the leaf device PE2 and a second data stream sent by another terminating device, such as the leaf device PE3, into a third data stream sent toward the root device PE1. The label lbl2, already allocated by the switching device SPE1, is used to transmit the data stream sent by the switching device SPE2 toward the switching device SPE1.

The switching device SPE2 then sends a message MSG111 toward the switching device SPE1, acknowledging receipt of the message MSG110 by the switching device SPE1.

The switching device SPE2 then sends a message MSG130 toward the leaf device PE2 and a message MSG140 toward the leaf device PE3. The message MSG130 comprises a label lbl3 intended to be associated with the data to be transmitted by the leaf device PE2 toward the switching device SPE2. The message MSG140 comprises a label lbl4 intended to be associated with the data to be transmitted by the leaf device PE3 toward the switching device SPE2.

The switching device SPE2 uses a routing table in order to transmit the messages MSG130 and MSG140 toward the leaf devices PE2 and PE3 respectively.

On receiving the message MSG130, the leaf device PE2 sends a message MSG131 toward the switching device SPE2, acknowledging receipt of the message MSG130.

On receiving the message MSG140, the leaf device PE3 sends a message MSG141 toward the switching device SPE2, acknowledging receipt of the message MSG140.

On receiving the message MSG120, the switching device SPE3 completes a switching table TC, using the data included in the request for the establishment of the pseudowire pw1. An entry is created in the switching table TC for the leaf device PE4 and the leaf device PE5.

At the end of this configuration step, the switching device SPE3 is capable of aggregating a first data stream transmitted by the leaf device PE4 and a second data stream sent by another terminating device, such as the leaf device PE5, into a third data stream sent toward the root device PE1. The label lbl5, already allocated by the switching device SPE1, is used to transmit the data stream sent by the switching device SPE3 toward the switching device SPE1.

The switching device SPE3 then sends a message MSG121 toward the switching device SPE1, acknowledging receipt of the message MSG120 by the switching device SPE1.

The switching device SPE3 then sends a message MSG150 toward the leaf device PE4 and a message MSG160 toward the leaf device PE5. The message MSG150 comprises a label lbl6 intended to be associated with the data to be transmitted by the leaf device PE4 toward the switching device SPE3. The message MSG160 comprises a label lbl7 intended to be associated with the data to be transmitted by the leaf device PE5 toward the switching device SPE3.

The switching device SPE3 uses a routing table in order to transmit the messages MSG150 and MSG160 toward the leaf devices PE4 and PE5 respectively.

On receiving the message MSG150, the leaf device PE4 sends a message MSG151 toward the switching device SPE3, acknowledging receipt of the message MSG150.

On receiving the message MSG160, the leaf device PE5 sends a message MSG161 toward the switching device SPE3, acknowledging receipt of the message MSG160.

At the end of all these message exchanges, the multipoint-to-point pseudowire pw1 is established between the leaf devices PE2, PE3, PE4 and PE5 and the root device PE1.

When the multipoint-to-point pseudowire pw1 has been established between the root device PE1 and the leaf devices PE2, PE3, PE4 and PE5, it can transmit the data streams sent by the various leaf devices PE2, PE3, PE4 and PE5 toward the root device PE1.

It should be noted that the first and second embodiments of the invention can be combined. This is because it is possible to establish a multipoint-to-point pseudowire pw1 at the initiative of the root device PE1 and then to connect the pseudowire pw1 to one or more additional leaf devices at the initiative of these leaf devices, according to the first embodiment of the invention.

In another embodiment of the invention, the switching devices SPE1, SPE2, and SPE3 can be configured manually to enable them to aggregate a first data stream transmitted by a first leaf device and a second data stream sent by a second leaf device into a third data stream to be sent to the root device.

Figure 4:
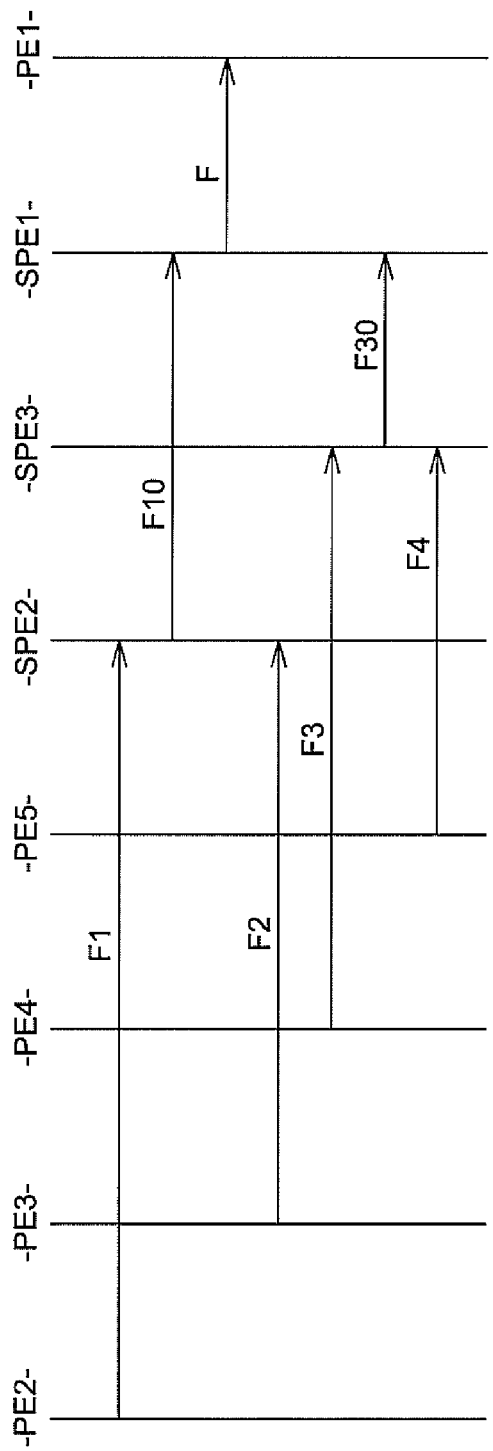
FIG. 4 shows a time diagram of the transmission of data streams from the leaf devices toward the root device via the multipoint-to-point pseudowire.

With reference to FIG. 4, the leaf device PE2 sends a data stream F1 toward the root device PE1. The label lbl3 is associated with the data making up the data stream F1. The data stream F1 is received by the switching device SPE2. The data obtained from the data stream F1 are marked by means of the label lbl2, and form a data stream F10. The data stream F10 is then transmitted toward the switching device SPE1. The data stream F10 is received by the switching device SPE1. The data obtained from the data stream F10 are marked by means of the label lbl1, and form a data stream F. The data stream F is then transmitted toward the root device PE1.

The leaf device PE3 sends a data stream F2 toward the root device PE1. The label lbl4 is associated with the data making up the data stream F2. The data stream F2 is received by the switching device SPE2.

Since the switching device SPE2 has been configured during the establishment of the pseudowire pw1 to aggregate a plurality of data streams originating from different leaf devices, the data stream F1 sent by the leaf device PE2 and the data stream F2 sent by the leaf device PE3 are aggregated by the switching device SPE2 to form the data stream F10. The data stream F10 generated in this way is transmitted toward the switching device SPE1.

The leaf device PE4 sends a data stream F3 toward the root device PE1. The label lbl6 is associated with the data making up the data stream F3. The data stream F3 is received by the switching device SPE3. The data obtained from the data stream F3 are marked by means of the label lbl5, and form a data stream F30. The data stream F30 is then transmitted toward the switching device SPE1. The data stream F30 is received by the switching device SPE1.

The leaf device PE5 sends a data stream F4 toward the root device PE1. The label lbl7 is associated with the data making up the data stream F4. The data stream F4 is received by the switching device SPE3.

Since the switching device SPE3 has been configured during the establishment of the pseudowire pw1 to aggregate a plurality of data streams originating from different leaf devices, the data stream F3 sent by the leaf device PE4 and the data stream F4 sent by the leaf device PE5 are aggregated by the switching device SPE3 to form the data stream F30. The data stream F30 generated in this way is transmitted toward the switching device SPE1.

Since the switching device SPE1 has been configured during the establishment of the pseudowire pw1 to aggregate a plurality of data streams originating from different leaf devices, the data stream F10 sent by the switching device SPE2 and the data stream F30 sent by the switching device SPE3 are aggregated by the switching device SPE1 to form the data stream F. The data stream F generated in this way is transmitted toward the root device PE1.

The data streams F1, F2, F3 and F4 are aggregated into a single data stream by the various switching nodes passed through, in such a way that the root device PE1 receives only a single data stream F formed by the data sent by the various leaf devices.

Figure 5:
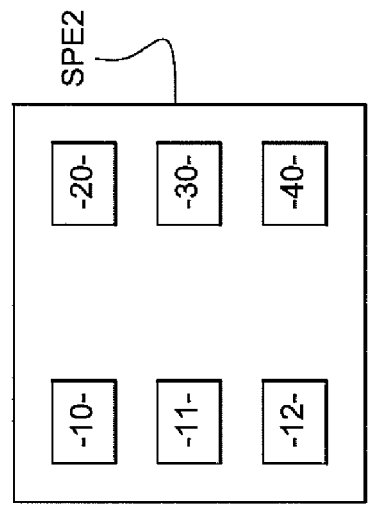
FIG. 5 shows a switching device intended to implement the invention.

FIG. 5 shows a switching device SPE1, SPE2, SPE3. This switching device comprises:
- means 10 for receiving data streams sent by leaf devices connected to the switching device,
- means 11 for aggregating the various data streams sent by the various leaf devices into a data stream intended to be transmitted toward the root device, the switching device having been configured to aggregate a plurality of data streams by means of a parameter, called the aggregation parameter, included in a request for the establishment of the pseudowire, means 12 for transmitting the aggregated data stream toward the root device.

The switching device further comprises:

means 20 for receiving a request for the establishment of the pseudowire, comprising an identifier of the root device, an identifier of at least one leaf device, an identifier of the pseudowire, and a parameter called the aggregation parameter, means 30 for configuring the switching device by means of the aggregation parameter, at the end of which the switching device is capable of aggregating a first data stream sent by the leaf device and a second data stream sent by another leaf device into a third data stream to be sent to the root device, means 40 for transmitting the request for the establishment of the pseudowire toward the destination device.

Figure 6:
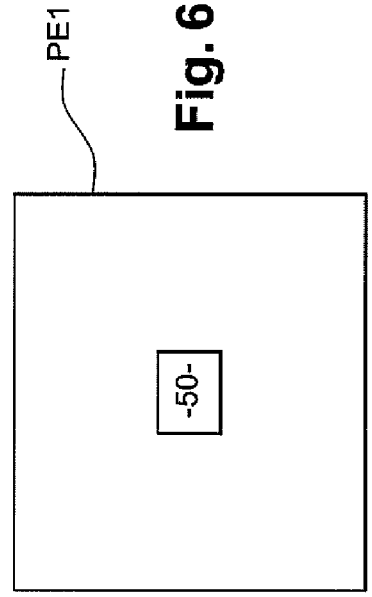
FIG. 6 shows a terminating device forming one end of the multipoint-to-point pseudowire.

FIG. 6 shows a terminating device PE1, PE2, PE3, PE4 and PE5. This terminating device comprises:

means 50 for sending a request for the establishment of the pseudowire, comprising an identifier of the root terminating device, an identifier of at least one leaf device, an identifier of the pseudowire and a parameter, called the aggregation parameter, intended for use in a step of configuration of a switching device which also belongs to the packet switched network, at the end of which step the switching device is capable of aggregating a first data stream sent by a first leaf device and a second data stream sent by a second leaf device into a third data stream.

The invention claimed is:

1. A method for establishing a multipoint-to-point pseudowire via which data streams are intended to be transmitted from a plurality of leaf devices toward a root device, the leaf devices and root device forming ends of the pseudowire, the pseudowire being based on a packet switched network to which the leaf devices belong, the method comprising:

receiving, from a first leaf device of the plurality of leaf devices, by a switching device, also belonging to the packet switched network, a request for the establishment of the pseudowire, comprising an identifier of the root device, an identifier of the first leaf device, an identifier of the pseudowire, and an aggregation parameter;

determining if the aggregation parameter is comprised in a switching table, and if said aggregation parameter is not comprised in said switching table, transmitting, by the switching device, the request for the establishment of the pseudowire to the root device;

completing the switching table with an entry comprising the identifier of the root device, the identifier of the first leaf device, the identifier of the pseudowire, and the aggregation parameter;

configuring the switching device to aggregate a first data stream sent by the first leaf device and a second data stream sent by another leaf device into a third data stream to be sent to the root device.

2. A non-transitory computer program product comprising program code instructions for implementing the steps of the establishment method as claimed in claim 1 when the program is executed by a processor.

3. A non-transitory recording medium, readable by a switching device, on which the program product as claimed in claim 2 is recorded.

4. A switching device belonging to a packet switched network which also includes terminating devices forming ends of a multipoint-to-point pseudowire via which data streams are intended to be transmitted from a plurality of leaf devices toward a root device, the switching device comprising:

means by which a switching device, also belonging to the packet switched network, receives a first data stream sent by a first leaf device of the plurality of leaf devices toward the root device;

means by which the switching device receives a second data stream sent by a second leaf device of the plurality of leaf devices toward the root device;

means by which the switching device receives, from the first leaf device, a request for establishment of a pseudowire, comprising an identifier of the root device, an identifier of the first leaf device, an identifier of the pseudowire, and an aggregation parameter;

means for determining if the aggregation parameter is comprised in a switching table, and if said aggregation parameter is not comprised in said switching table, transmitting, by the switching device, the request for the establishment of the pseudowire to the root device;

means for completing the switching table with an entry comprising the identifier of the root device, the identifier of the first leaf device, the identifier of the pseudowire, and the aggregation parameter;

means by which the first and second data streams are aggregated into a third data stream, the switching device having been configured to aggregate the first and second data streams; and means by which the third data stream is transmitted toward the root device.

\* \* \* \* \*